(12) United States Patent
Fuss et al.

(10) Patent No.: US 6,192,194 B1
(45) Date of Patent: Feb. 20, 2001

(54) CAMERA HOUSING WITH WINDOW INSERT CONFORMING TO HOUSING SHAPE

(75) Inventors: Timothy J. Fuss, Rochester; Dennis R. Zander, Penfield, both of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/522,132

(22) Filed: Mar. 9, 2000

(51) Int. Cl.$^7$ ............................. G03B 17/02; G03B 13/02
(52) U.S. Cl. ............................. 396/6; 396/373; 396/382; 396/535
(58) Field of Search .................. 396/6, 373, 377, 396/378, 379, 380, 381, 382, 383, 384, 385, 386

(56) References Cited

U.S. PATENT DOCUMENTS

| | | |
|---|---|---|
| 2,505,140 | 4/1950 | Peltz et al. . |
| 4,812,866 | 3/1989 | Ushiro et al. . |
| 4,882,600 | 11/1989 | VanDeMoere . |
| 5,285,228 | 2/1994 | VanDeMoere . |
| 5,600,391 | 2/1997 | VanDeMoere . |
| 5,721,963 * | 2/1998 | Iwagaki et al. ........................ 396/6 |
| 6,112,026 * | 8/2000 | Rydelek et al. ........................ 396/6 |

* cited by examiner

*Primary Examiner*—David M. Gray
(74) *Attorney, Agent, or Firm*—Roger A. Fields

(57) ABSTRACT

A camera housing comprises an exterior longitudinal edge that is curved widthwise; a single opening through the exterior longitudinal edge that interrupts the exterior longitudinal edge to create a gap in the exterior longitudinal edge; and an insert having a longitudinal edge that is curved widthwise the same as the exterior longitudinal edge and configured to fit in the opening to align the longitudinal edge of the insert with the exterior longitudinal edge in order that the longitudinal edge of the insert is positioned within the gap to appear to be a continuation of the exterior longitudinal edge, and including a viewfinder window with an exterior flat face that is inclined into the longitudinal edge of the insert to at least partially interrupt the longitudinal edge of the insert in order to prevent the occurrence of image distortion when looking though the viewfinder window in the vicinity of the longitudinal edge of the insert.

8 Claims, 2 Drawing Sheets

CAMERA HOUSING WITH WINDOW INSERT CONFORMING TO HOUSING SHAPE

FIELD OF THE INVENTION

The invention relates generally to the field of photography, and in particular to cameras. More specifically, the invention relates to an insert in a camera housing that conforms to the housing shape and includes a viewfinder window.

BACKGROUND OF THE INVENTION

The visual appearance and the compactness of a camera housing are each a critical factor in a camera's design. It is generally known to curve the longitudinal edges of the camera housing widthwise to create a pleasing soft appearance. The problem is created, however, that front and rear viewfinder windows in the camera housing usually are flat and, therefore, cannot be at one of the curved longitudinal edges. This takes away from the compactness of the camera housing. If the viewfinder window was curved in conformity with the curved longitudinal edge to provide compactness, one would see image distortion when looking through the viewfinder window in the vicinity of the curved longitudinal edge.

SUMMARY OF THE INVENTION

According to the invention, a camera housing comprises:

an exterior longitudinal edge that is curved widthwise;

a single opening through the exterior longitudinal edge that interrupts the exterior longitudinal edge; and a viewfinder window tapered within the opening, and including an exterior flat face that is inclined inwardly of the exterior longitudinal edge to prevent the occurrence of image distortion when looking through the viewfinder window in the vicinity of the exterior longitudinal edge.

More particularly, the camera housing comprises:

an exterior longitudinal edge that is curved widthwise;

a single opening through the exterior longitudinal edge that interrupts the exterior longitudinal edge to create a gap in the exterior longitudinal edge; and an insert having a longitudinal edge that is curved widthwise the same as the exterior longitudinal edge and configured to fit in the opening to align the longitudinal edge of the insert with the exterior longitudinal edge in order that the longitudinal edge of the insert is positioned within the gap to appear to be a continuation of the exterior longitudinal edge, and including a viewfinder window with an exterior flat face that is inclined into the longitudinal edge of the insert to at least partially interrupt the longitudinal edge of the insert in order to prevent the occurrence of image distortion when looking though the viewfinder window in the vicinity of the longitudinal edge of the insert.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
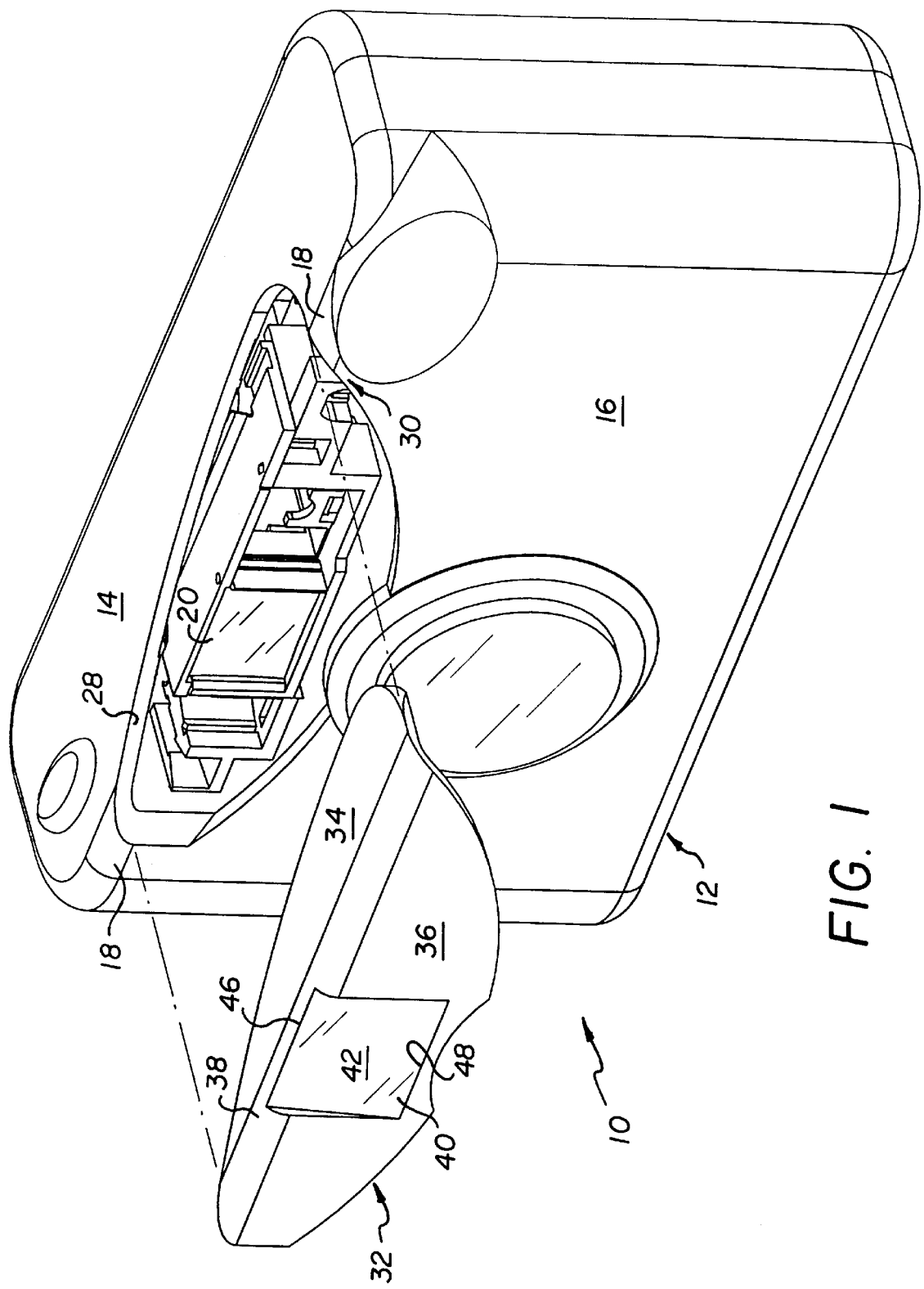
FIG. 1 is a partially exploded front perspective view of a camera which is a preferred embodiment of the invention, showing an insert with an integral front viewfinder window exploded from a housing of the camera.

Referring now to the drawings, FIG. 1 shows a camera 10 including a housing 12 that has a top exterior flat wall 14 and a front exterior flat wall 16. An exterior longitudinal edge 18 divides the housing top wall 14 and the housing front wall 16 and is uniformly curved widthwise between the two walls.

Figure 2:
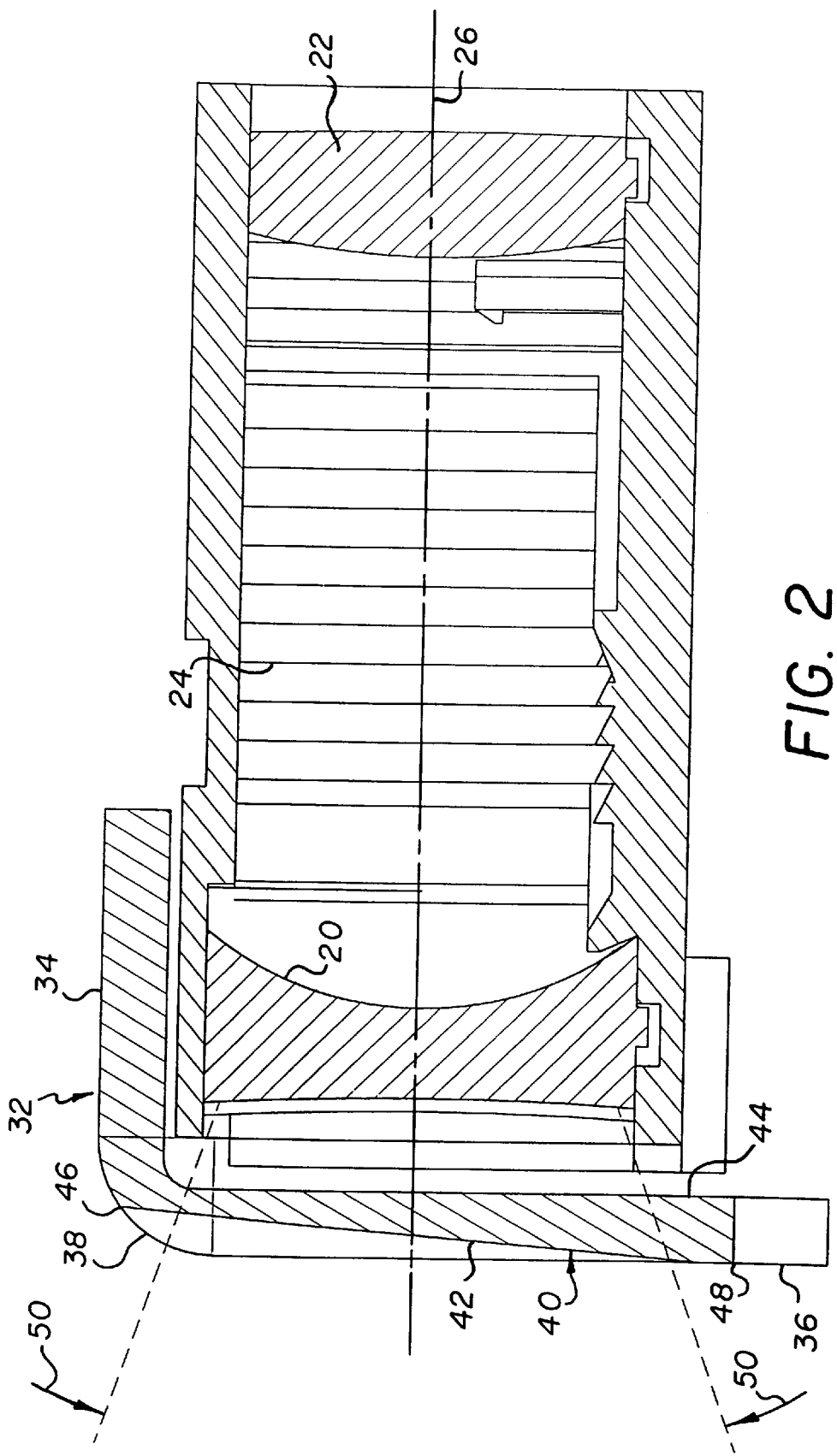
FIG. 2 is a section view of the insert and a viewfinder within the camera housing.

A known front viewfinder lens 20 and a known rear (eye) viewfinder lens 22 are fixed apart within a viewfinder tunnel 24 inside the camera housing 12, as shown in FIG. 2. The front and rear viewfinder lenses 20 and 22 have the same lens axis 26.

A single opening 28 is provided though the housing top wall 14 and the housing front wall 16. As shown in FIG. 1, the opening 28 is through the housing longitudinal edge 18, which interrupts the housing longitudinal edge to create an elongate gap 30 in it.

An insert 32 has a top exterior flat wall 34, a front exterior flat wall 36, and an exterior longitudinal edge 38 that is uniformly curved widthwise between the insert top wall and the insert front wall. The insert longitudinal edge 38 has the same curvature widthwise as the housing longitudinal edge 18 is curved widthwise between the housing top wall 14 and the housing front wall 16. The insert 32 is configured to fit in the opening 28, as indicated in FIG. 1, to align the insert longitudinal edge 38 with the housing longitudinal edge 18. This positions the insert longitudinal edge 38 within the gap 30, for the insert longitudinal edge to appear to be a continuation of the housing longitudinal edge 18. When the insert 32 is fitted in the opening 28, its top wall 34 is flush with the housing top wall 14 and its front wall 36 is flush with the housing front wall 16.

A transparent front viewfinder window 40, preferably a tapered optical wedge, is an integral portion of the insert 32. As shown in FIG. 2, the viewfinder window 40 has an exterior front flat face 42 that is inclined inwardly beginning from the insert front wall 36 to partially into the insert longitudinal edge 38, and an interior rear flat face 44 that is not inclined. The inclination of the window front face 42 into the insert longitudinal edge 38 partially interrupts the insert longitudinal edge, as can be seen in FIGS. 1 and 2. This prevents the occurrence of image distortion, which would otherwise at the insert longitudinal edge 38, when one looks through the rear viewfinder lens 22, though the front viewfinder lens 20, and through the viewfinder window 40, because the insert longitudinal edge is curved widthwise. The window front face 42 has a top linear longitudinal edge 46 and a bottom linear longitudinal edge 48 that are located outside the field (angle) of view 50 of the front and rear viewfinder lenses 20 and 22. This is shown in FIG. 2. The bottom linear longitudinal edge 48 is in common with the insert front wall 36, rather than recessed from the insert front wall, in order to prevent the accumulation of dust at the bottom liner longitudinal edge.

As shown in FIG. 2, the lens axis 26 is slightly bent downward from the window front face 42.

The invention has been described with reference to a preferred embodiment. However, it will be appreciated that variations and modifications can be effected by a person of ordinary skill in the art without departing from the scope of the invention.

PARTS LIST 10. camera
12. housing 14. housing top wall
16. housing front wall
18. housing longitudinal edge
20. front viewfinder lens
22. rear viewfinder lens
24. viewfinder tunnel
26. lens axis
28. opening
30. gap
32. insert
34. insert top wall
36. insert front wall
38. insert longitudinal edge
40. viewfinder window or optical wedge
42. window front face
44. window rear face
46. windowtop edge
48. window bottom edge
50. field (angle) of view

What is claimed is:

1. A camera housing comprising:
an exterior longitudinal edge that is curved widthwise;
a single opening through said exterior longitudinal edge that interrupts the exterior longitudinal edge; and
a viewfinder window tapered within said opening, and including an exterior flat face that is inclined inwardly of said exterior longitudinal edge to prevent the occurrence of image distortion when looking through said viewfinder window in the vicinity of said exterior longitudinal edge.

2. A camera housing comprising:
an exterior longitudinal edge that is curved widthwise;
a single opening through said exterior longitudinal edge that interrupts the exterior longitudinal edge to create a gap in said exterior longitudinal edge; and
an insert having a longitudinal edge that is curved widthwise the same as said exterior longitudinal edge and configured to fit in said opening to align the longitudinal edge of said insert with said exterior longitudinal edge in order that the longitudinal edge of said insert is positioned within said gap to appear to be a continuation of said exterior longitudinal edge, and including a viewfinder window with an exterior flat face that is inclined into the longitudinal edge of said insert to at least partially interrupt the longitudinal edge of said insert in order to prevent the occurrence of image distortion when looking though said viewfinder window in the vicinity of the longitudinal edge of said insert.

3. A camera housing as recited in claim 2, wherein said exterior longitudinal edge divides a housing top exterior wall and a housing front exterior wall and is curved widthwise between said housing top and front exterior walls, and said opening is though said housing top and front exterior walls.

4. A camera as recited in claim 3, wherein said insert has a front exterior wall that is flush with said housing front exterior wall when said insert is in said opening, and said exterior flat face of said window is inclined inwardly beginning from said front exterior wall of said insert to into said longitudinal edge of the insert.

5. A camera housing as recited in claim 2, wherein a viewfinder lens is fixed behind said viewfinder window.

6. A camera housing as recited in claim 5, wherein said viewfinder lens has a lens axis that extends through said viewfinder window, and said viewfinder window is an optical wedge that bends the lens axis.

7. A camera housing comprising:
an exterior longitudinal edge that is curved widthwise;
a single opening through said exterior longitudinal edge; and
a viewfinder optical wedge that is tapered within said opening, and including an exterior flat face that is inclined inwardly of said exterior longitudinal edge to prevent the occurrence of image distortion when looking through said viewfinder window in the vicinity of said exterior longitudinal edge.

8. A camera housing comprising:
a housing front exterior wall;
an exterior longitudinal edge along said housing front exterior wall that is curved widthwise;
a single opening through said housing front exterior wall and said exterior longitudinal edge; and
a viewfinder optical wedge tapered within said opening, and including an exterior flat face that is inclined inwardly from said housing front exterior wall to said exterior longitudinal edge to prevent the occurrence of image distortion when looking through said viewfinder window in the vicinity of said exterior longitudinal edge.

* * * * *